(12) United States Patent
Krannich et al.

(10) Patent No.: US 6,991,087 B2
(45) Date of Patent: Jan. 31, 2006

(54) CONVEYOR DEVICE FOR ADVANCING WORK-PIECES THROUGH A PROCESSING ZONE FOR THE SURFACE TREATMENT OF THE WORK-PIECES

(75) Inventors: Edmund Krannich, Heimsheim (DE); Gerhard Mogck, Untergruppenbach (DE); Konrad Ortlieb, Stuttgart (DE); Andreas Schmohl, Frickenhausen (DE); Heinrich Weeber, Markgroeningen (DE); Juergen Weschke, Weil der Stadt (DE); Guenter Zerweck, Korntal-Muenchingen (DE)

(73) Assignees: Duerr Systems GmbH, Stuttgart (DE); Duerr Automotion GmbH, Stuttgart (DE)

( * ) Notice: Subject to any disclaimer, the term of this patent is extended or adjusted under 35 U.S.C. 154(b) by 132 days.

(21) Appl. No.: 10/670,991

(22) Filed: Sep. 25, 2003

(65) Prior Publication Data
US 2005/0061616 A1 Mar. 24, 2005

Related U.S. Application Data

(63) Continuation of application No. PCT/EP02/04074, filed on Apr. 12, 2002.

(30) Foreign Application Priority Data
Apr. 28, 2001 (DE) ............................ 101 21 053

(51) Int. Cl.
*B65G 29/00* (2006.01)

(52) U.S. Cl. ............... 198/465.1; 198/375; 118/416; 134/73

(58) Field of Classification Search ............. 198/375, 198/465.1, 465.2, 580; 118/503, 416; 134/73, 134/123, 153, 157, 152
See application file for complete search history.

(56) References Cited

U.S. PATENT DOCUMENTS

| 4,236,542 | A | * | 12/1980 | Fishburn | 134/153 |
|---|---|---|---|---|---|
| 4,691,640 | A | * | 9/1987 | Murai | 104/140 |
| 4,772,374 | A | * | 9/1988 | Urquhart et al. | 204/625 |
| 4,827,598 | A | * | 5/1989 | Sakamoto et al. | 29/430 |
| 4,951,802 | A | * | 8/1990 | Weissgerber et al. | 198/346.1 |
| 5,012,917 | A | | 5/1991 | Gilbert et al. | |

(Continued)

FOREIGN PATENT DOCUMENTS

WO 01/17691 3/2001

*Primary Examiner*—Gene O. Crawford
*Assistant Examiner*—Rashmi Sharma
(74) *Attorney, Agent, or Firm*—Lipsitz & McAllister, LLC

(57) ABSTRACT

The invention relates to a conveyor device which is used to transport work-pieces, especially the work-pieces of motor vehicle bodies, through a processing area for surface treatment of said work-pieces, comprising a conveyor which brings the work-pieces which are respectively maintained by a holder into the processing area; transports them through said area and removes them therefrom. The inventive conveyor device requires less maintenance in comparison with known conveyor devices. The holders respectively comprise a base part which moves in a translatory movement along a conveyor device and a rotating part on which the work-piece is arranged and which is held in such a way that it is rotatable on the base part. The conveyor comprises at least one drive device enabling at least one directly driven respective holder to be driven directly in a movement along the conveyor device. The movement of the directly driven holder is transferred to an indirectly driven holder as a result of the contact between the directly driven holder and said at least one indirectly driven holder.

15 Claims, 10 Drawing Sheets

U.S. PATENT DOCUMENTS

| | | |
|---|---|---|
| 5,242,045 A | 9/1993 | Kakida et al. |
| 5,433,783 A * | 7/1995 | Ichinose et al. ............ 118/416 |
| 5,531,830 A * | 7/1996 | Ichinose et al. ............ 118/423 |
| 5,686,148 A * | 11/1997 | Suzuki ........................ 427/444 |
| 5,972,112 A * | 10/1999 | Wood et al. ................ 118/423 |
| 6,372,107 B1 * | 4/2002 | Besinger et al. ............ 204/479 |
| 6,419,983 B1 * | 7/2002 | Kreuzer ....................... 427/242 |
| 6,619,466 B1 * | 9/2003 | Jack et al. ................... 198/373 |
| 6,679,370 B2 * | 1/2004 | Kasagi ..................... 198/465.1 |
| 6,732,852 B2 * | 5/2004 | Kilabards et al. ........ 198/465.4 |
| 6,745,888 B2 * | 6/2004 | Sagane et al. ........... 198/346.3 |

* cited by examiner

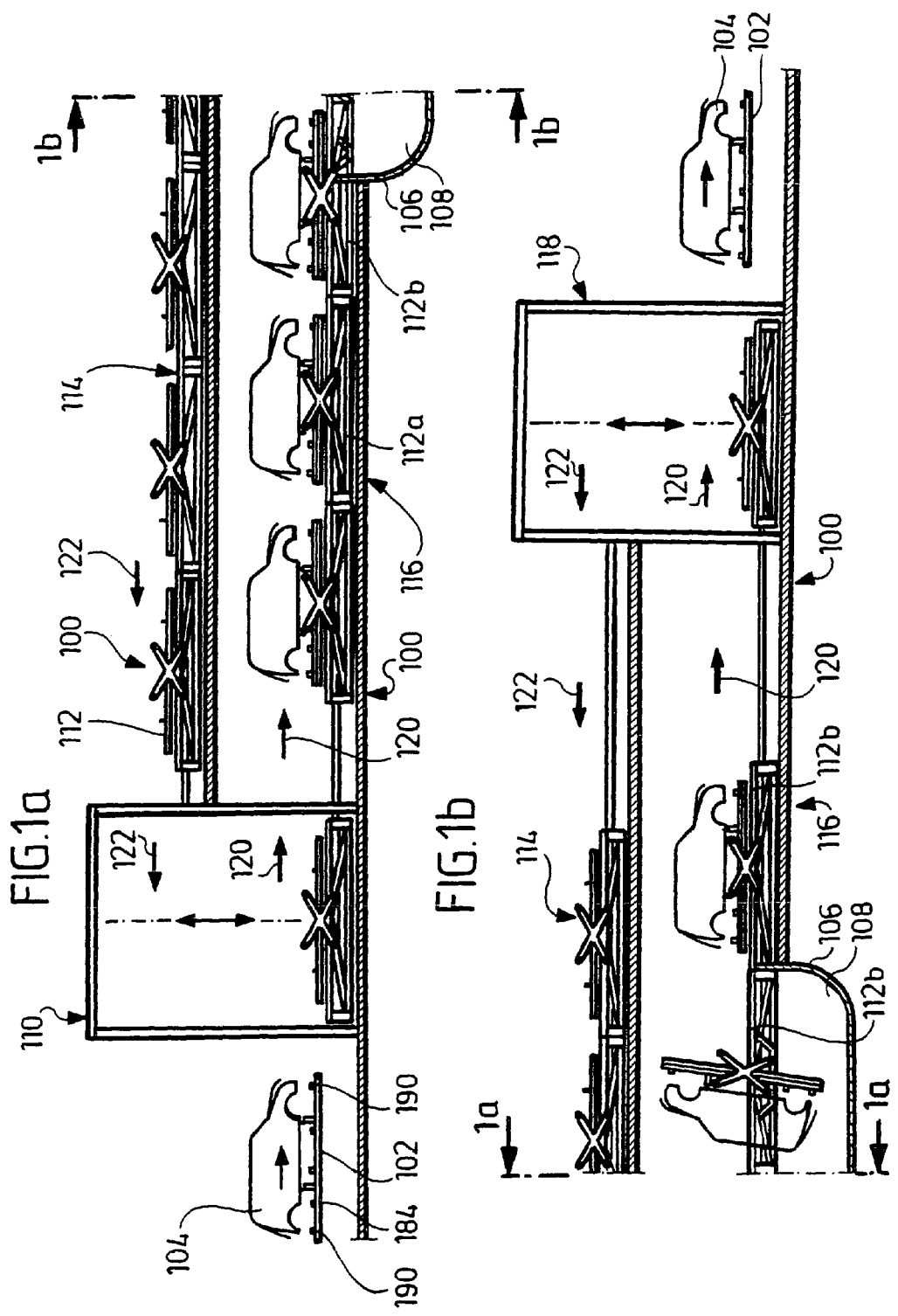

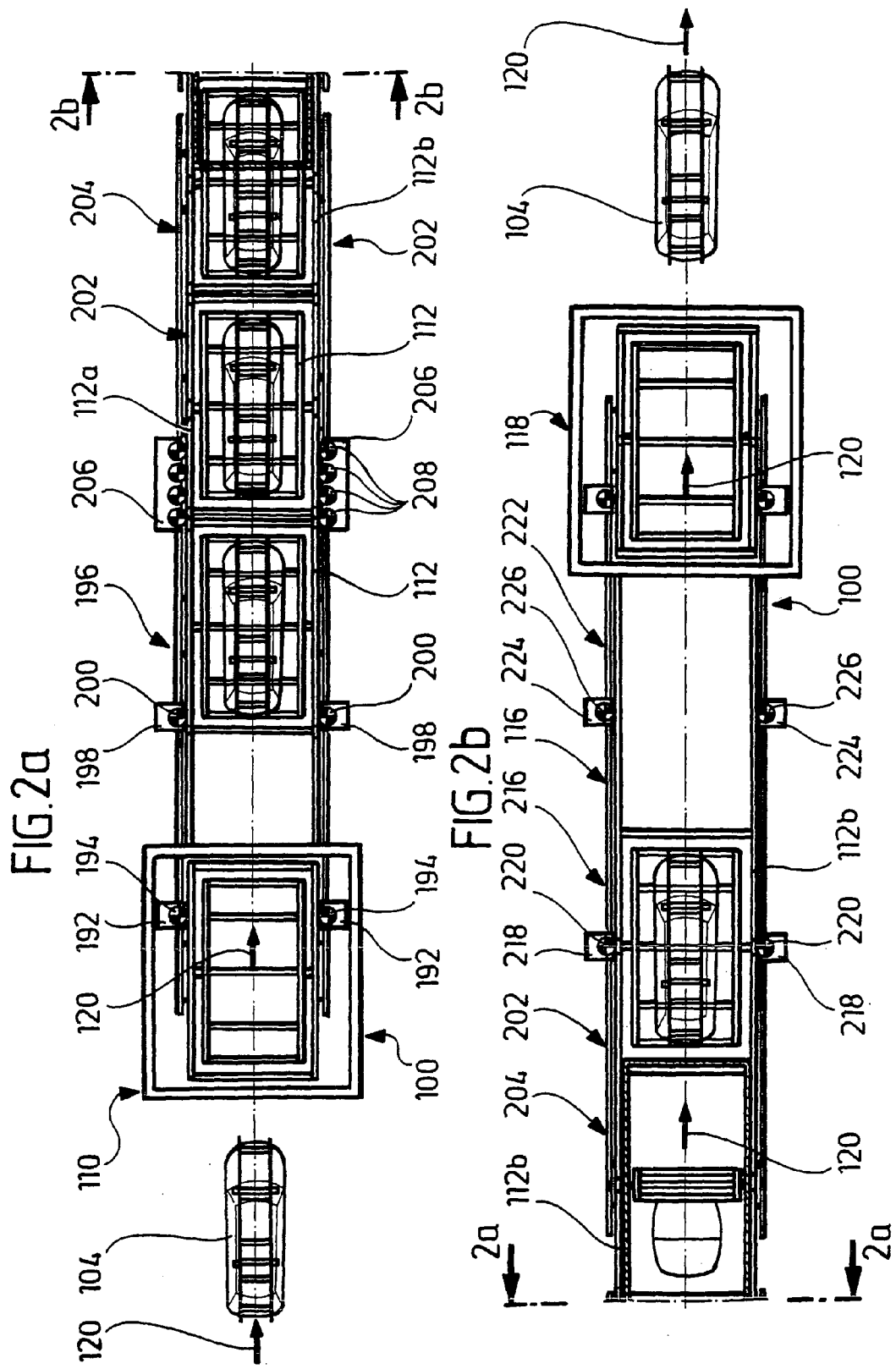

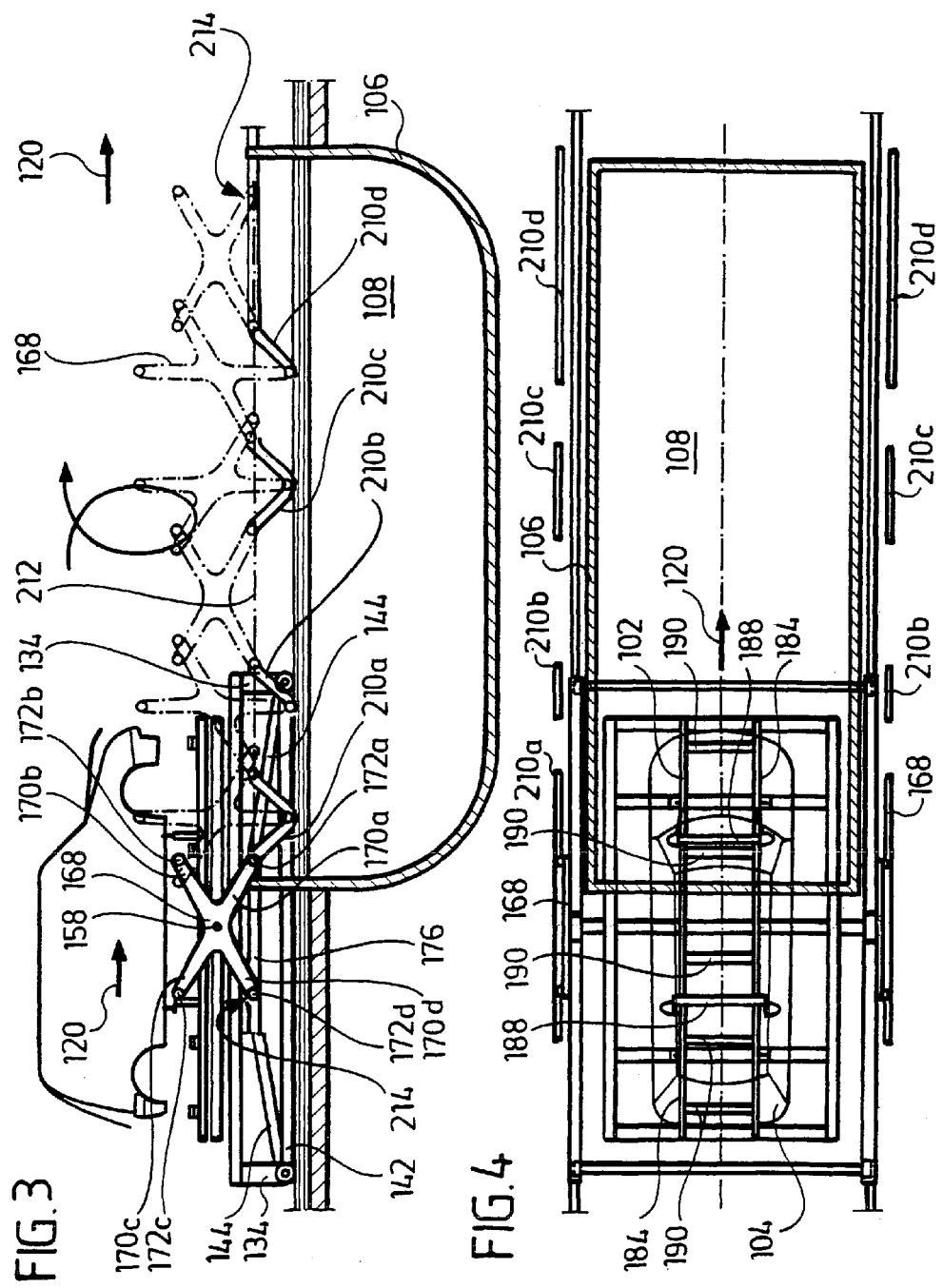

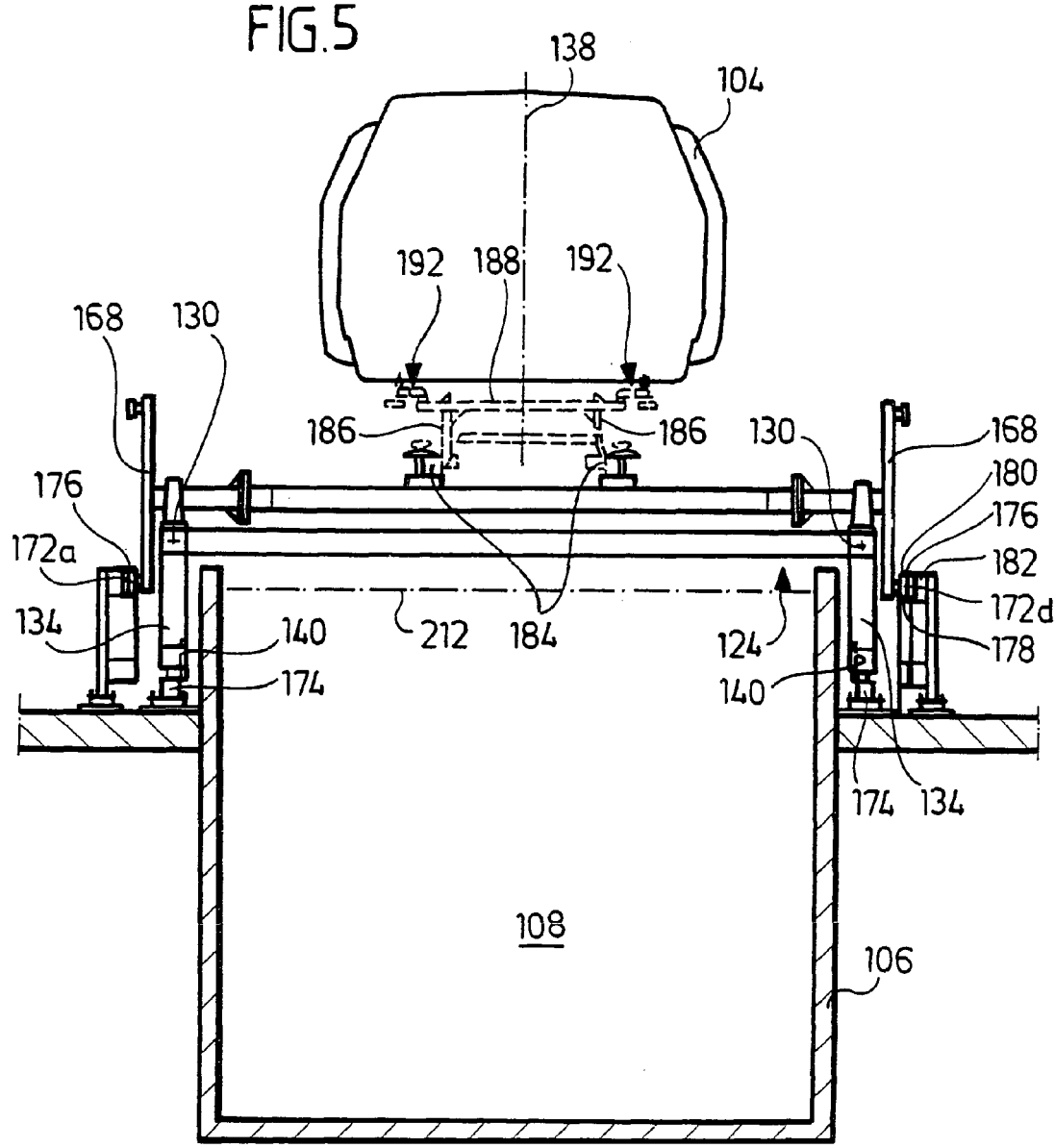

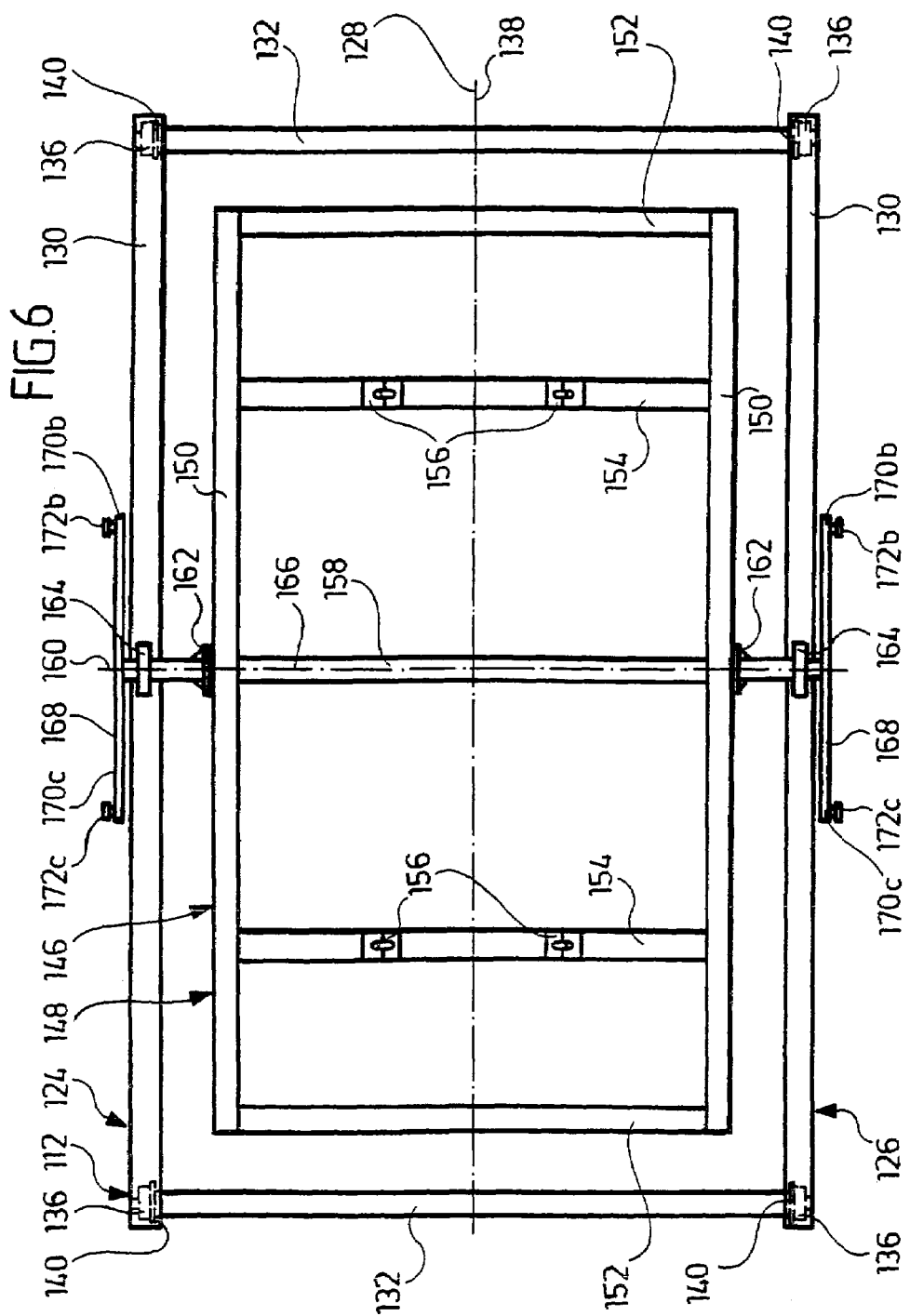

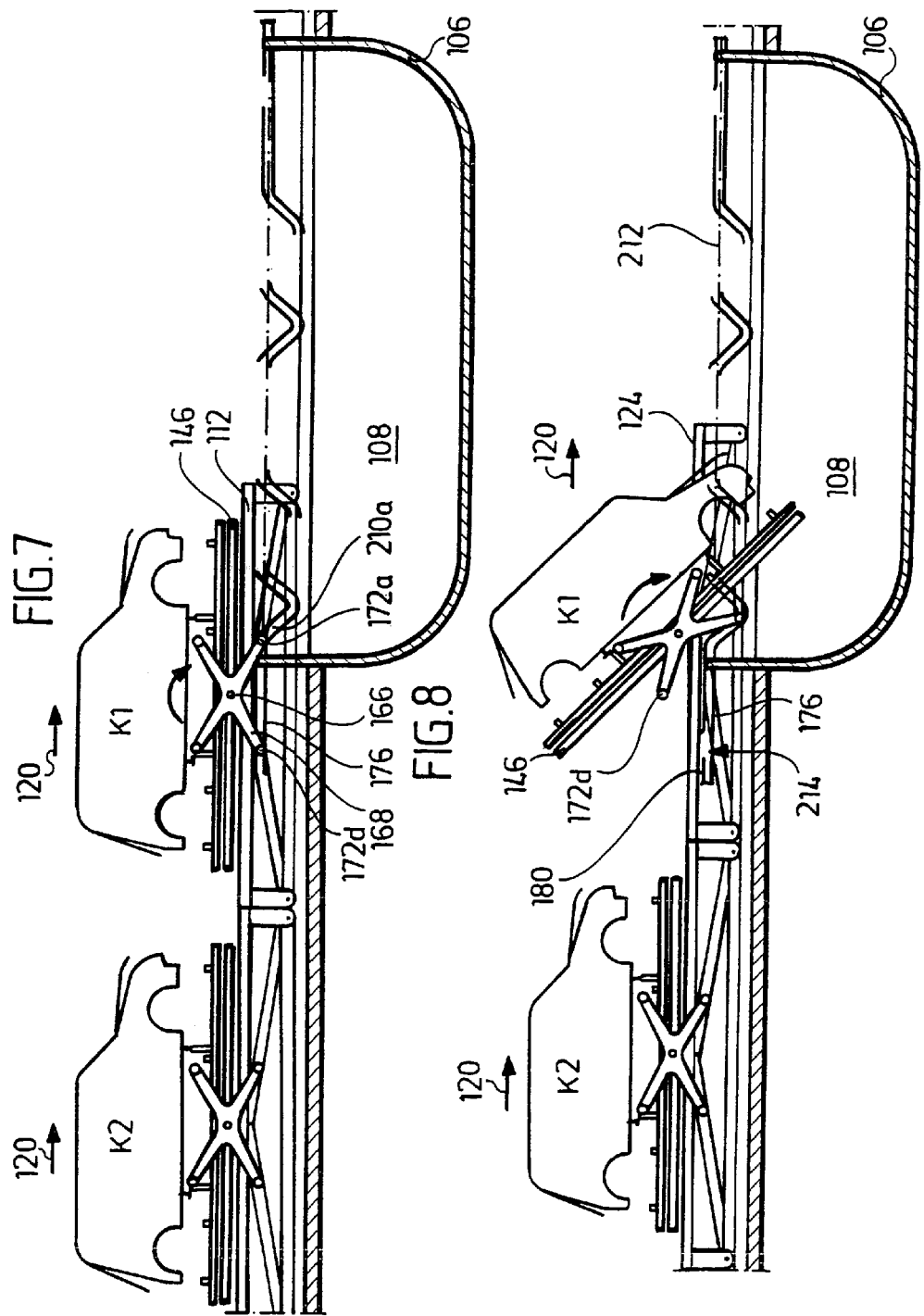

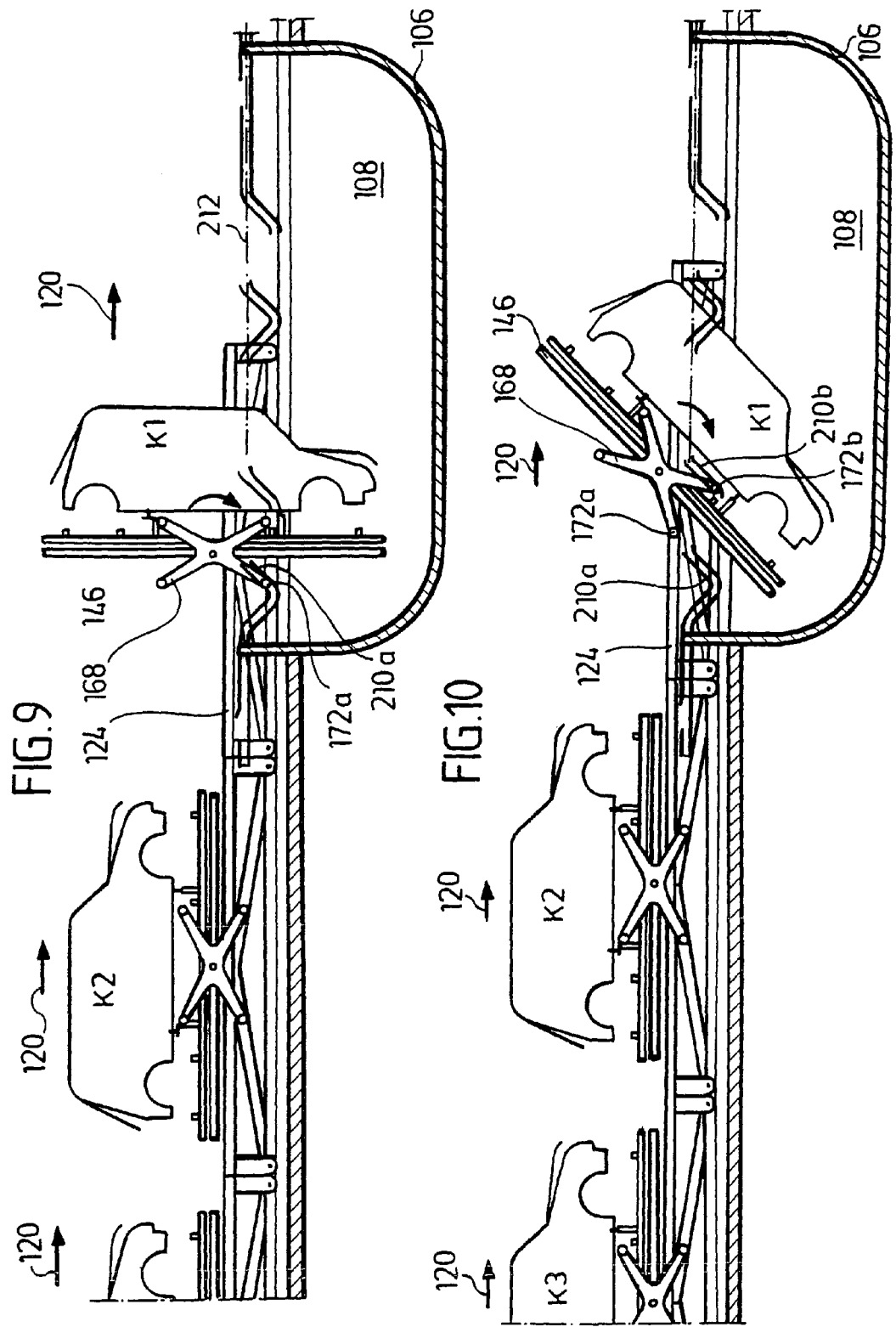

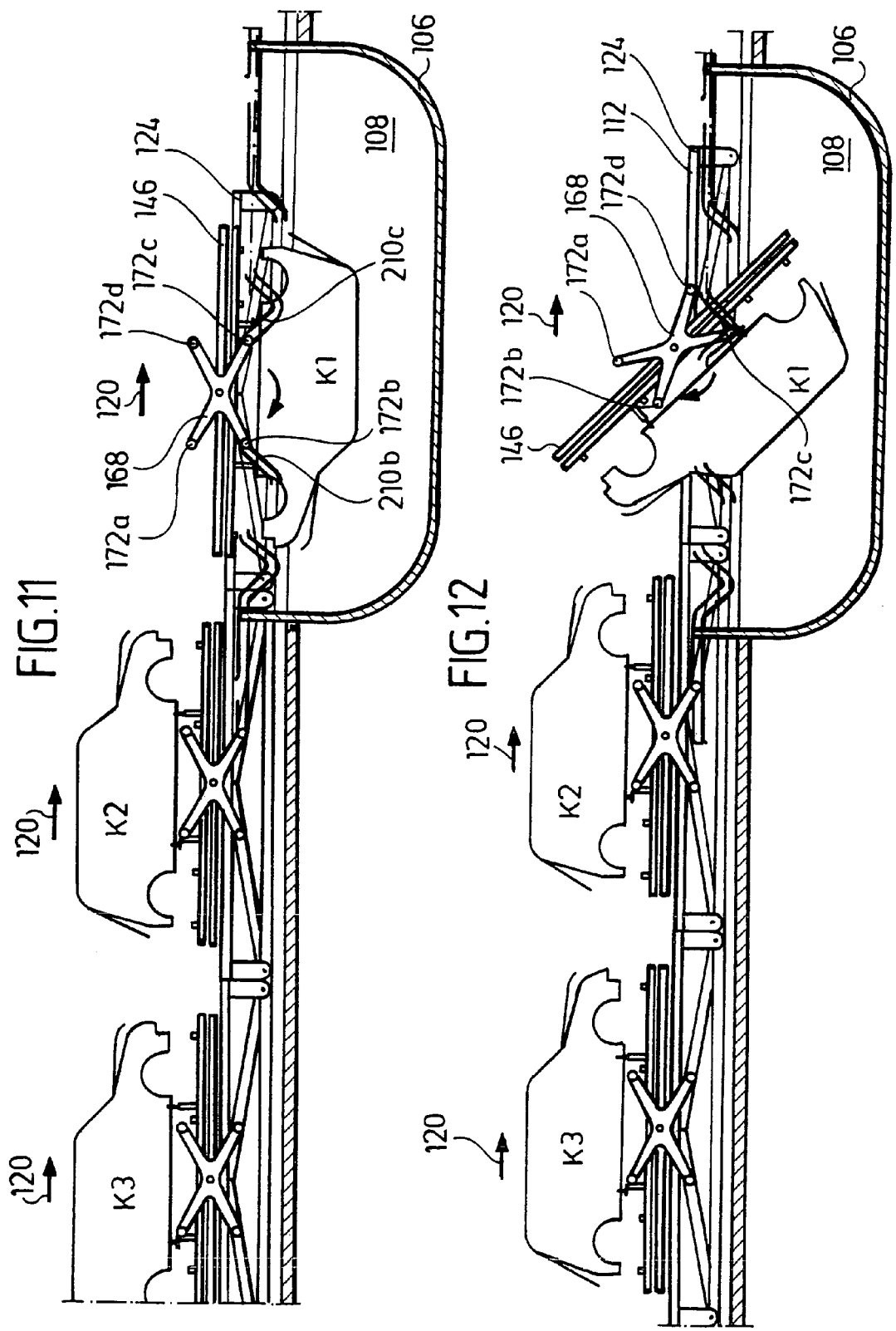

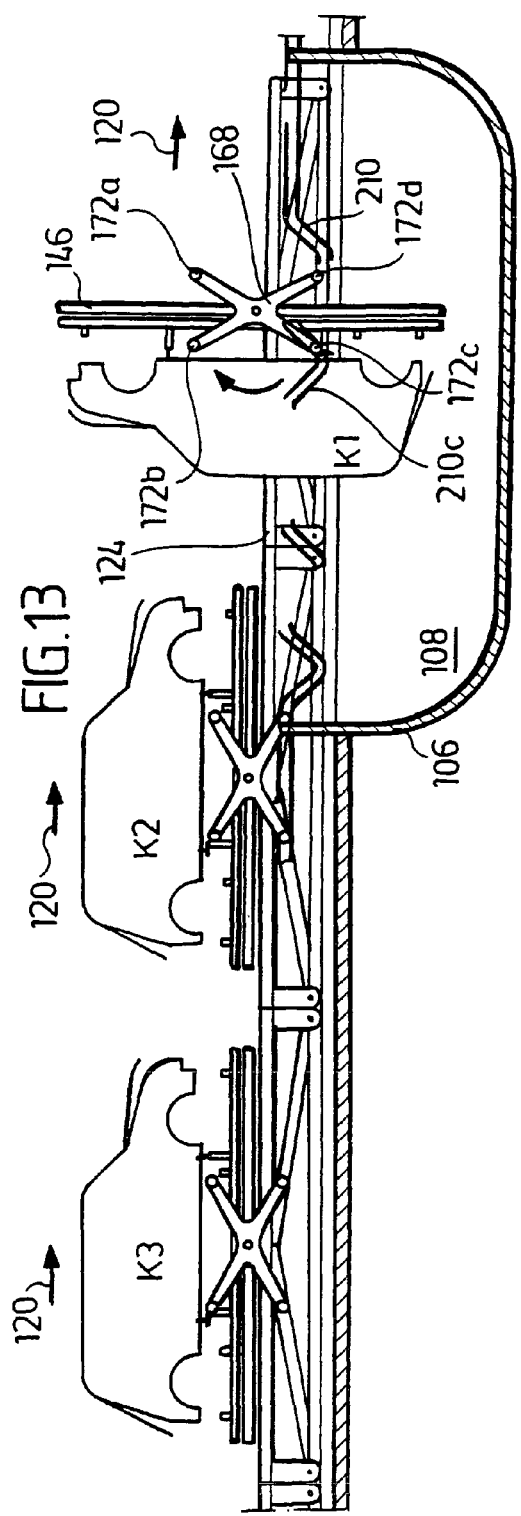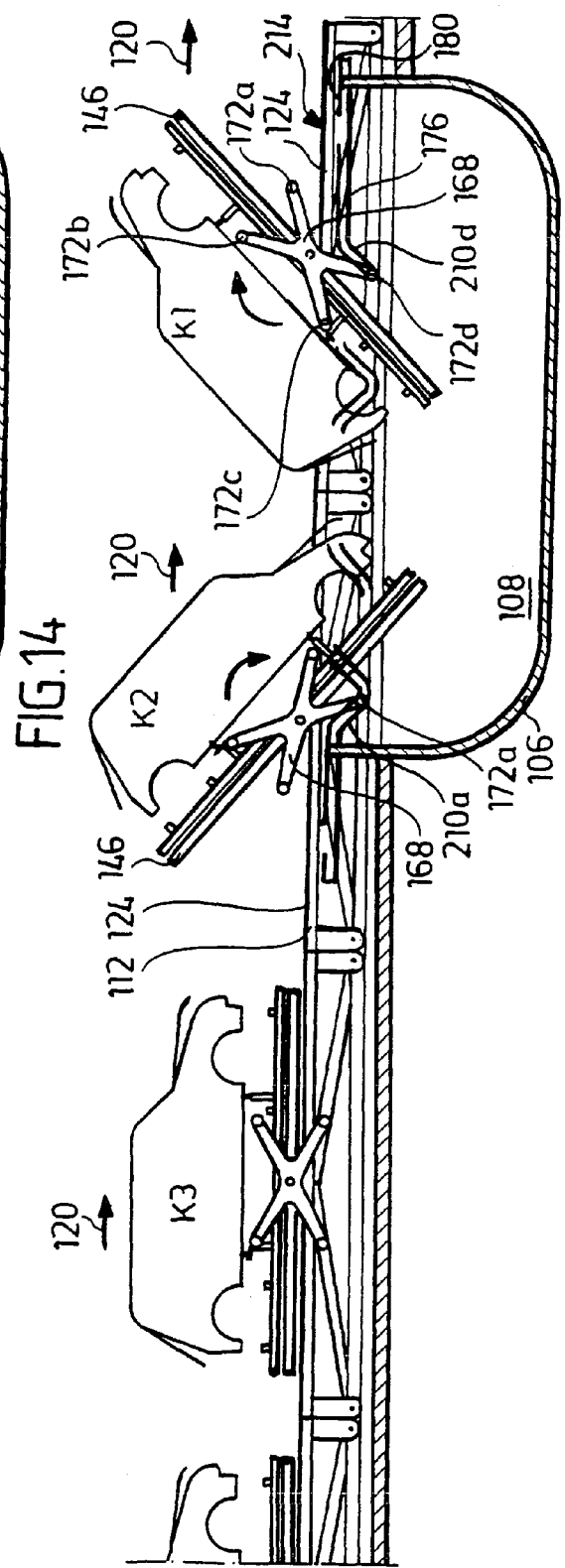

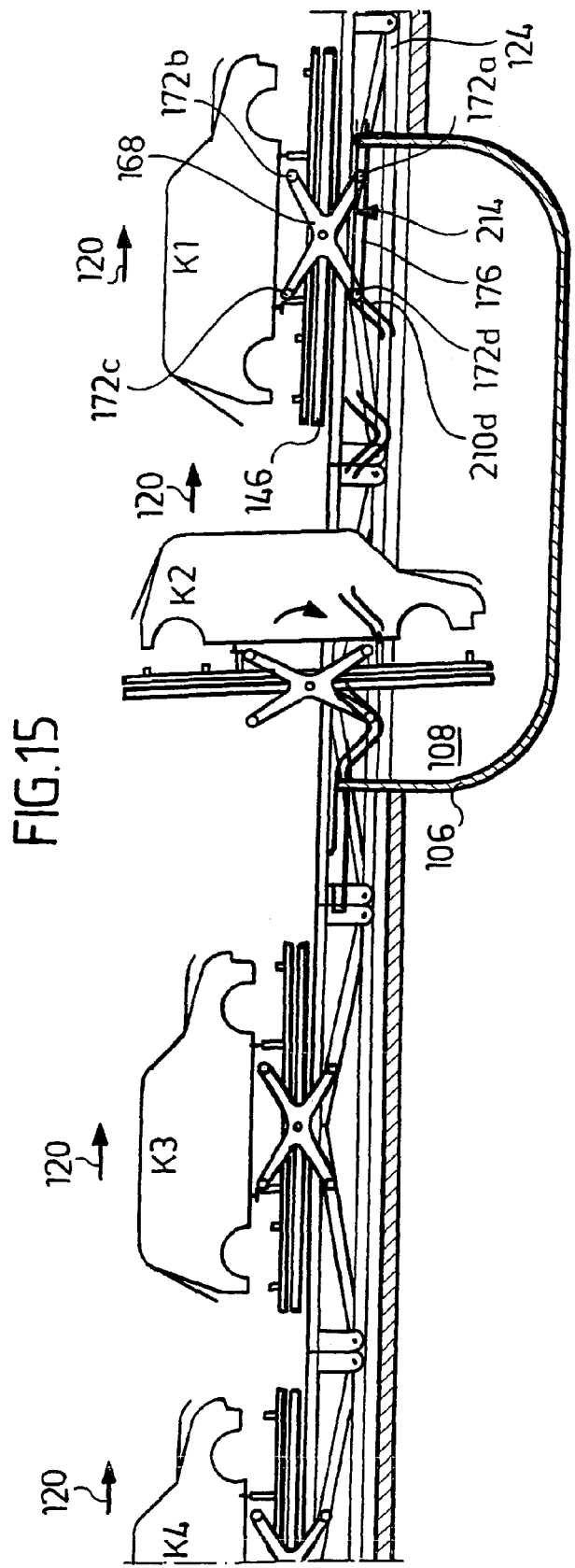

CONVEYOR DEVICE FOR ADVANCING WORK-PIECES THROUGH A PROCESSING ZONE FOR THE SURFACE TREATMENT OF THE WORK-PIECES

The present disclosure relates to the subject matter disclosed in International Application No. PCT/EP02/04074 of Apr. 12, 2002, which is incorporated herein by reference in its entirety and for all purposes.

The present invention relates to a conveyor device for advancing work-pieces, in particular vehicle bodies, through a processing zone for the purposes of treating the surface of the work-pieces, said device comprising a conveyor which moves the work-pieces that are held on respective mounting devices into the processing zone, advances them through the processing zone and then removes them from the processing zone.

Such a conveyor device is known from DE 196 41 048 A1.

In the case of this known conveyor device, vehicle bodies are arranged in releasable manner on a respective mounting frame which is advanced in the direction of conveyance by means of conveyor chains and is rotatable about a horizontal axis that is aligned perpendicularly relative to the direction of conveyance. The mounting rack together with the vehicle body arranged thereon is additionally rotated during its translatory movement in the direction of conveyance by means of levers that are provided on the mounting frame and are equipped with rollers which roll on fixed guide rails, the rotary motion being such that the vehicle body attached thereto plunges into a treatment bath, is advanced through the treatment bath and is then moved out from the treatment bath.

In the case of the known conveyor device, the advancement of the mounting racks by means of conveyor chains has the associated disadvantage that such a chain drive is very maintenance-intensive, since, for example, the conveyor chains must be lubricated. Furthermore, the conveyor chains are subjected to a high degree of wear-and-tear so that the conveyor chains must be replaced on a frequent basis. If a defect occurs in a conveyor chain, then the entire chain circulating through the conveyor device has to be removed from the conveyor device. The wear on the conveyor chains increases still more if the conveyor chains are exposed to aggressive vapours in the processing zone or in the proximity thereof. Furthermore, there will always be a danger that the processing zone, for example a dip-coating tank, will be contaminated by abraded particles of the chain.

Consequently, the object of the present invention is to produce a conveyor device of the type mentioned hereinabove which is less maintenance-intensive than the known conveyor devices.

In accordance with the invention, this object is achieved in the case of a conveyor device incorporating the features mentioned in the preamble of Claim 1 in that the mounting devices each comprise a base part that is moved in translatory manner in the direction of conveyance and a rotary part upon which the work-piece is arranged and which is mounted on the base part in rotatable manner, and in that the conveyor comprises at least one drive device by means of which at least one respective directly driven mounting device is adapted to be directly driven for movement in the direction of conveyance, whereby, by virtue of a contact between the directly driven mounting device and at least one indirectly driven mounting device, the movement of the directly driven mounting device is transmitted to the indirectly driven mounting device.

The concept according to the invention for the production of the translatory movement of the mounting devices in the direction of conveyance offers the advantage that it then becomes possible to dispense with a conveyor element, such as a conveyor chain for example, which circulates through the conveyor device. Due to dispensing with a conveyor element that extends entirely through the conveyor device, the conveyor device in accordance with the invention requires very little maintenance since the lubrication of the conveyor element that would otherwise be necessary is no longer required. Furthermore, due to the omission of the conveyor element, there is no longer a danger that the processing zone, for example a dip tank, will be polluted by abrasive particles stemming from the conveyor element.

Furthermore, the conveyor device in accordance with the invention is subject to a lesser degree of wear-and-tear than a conveyor device using a circulating continuous conveyor element.

Since the mounting devices are not fixed to a circulating conveyor element in the case of the conveyor device in accordance with the invention, individual mounting devices can easily be removed from the conveyor device should this be necessary for maintenance or repair purposes. The gap resulting from the removal of an individual mounting device is immediately closed-up by virtue of the fact that a mounting device arranged behind the removed mounting device in the direction of conveyance will be moved towards the arranged prior to the removed mounting device in the direction of conveyance until the two mounting devices come into contact with one another. In contrast to the removal of a mounting device fixed to a circulating continuous conveyor element, there will thus be no lasting gap between the respective mounting devices being advanced through the processing zone.

Furthermore, the mounting devices can be guided on running and/or guide rails which are arranged laterally of and adjacent to the processing zone although at a sufficiently large distance therefrom so that these rails will not be exposed to aggressive vapours from the processing zone.

Furthermore, the mounting devices of the conveyor device in accordance with the invention may be provided with a torsionally stiff framework which ensures that the mounting devices will not rotate about an axis of rotation aligned perpendicularly relative to the direction of conveyance during the movement thereof through the processing zone. In the case of the known conveyor device using a chain drive, such a rotation cannot be excluded since the connection of the mounting devices to the conveyor chains is not torsionally stiff and the speeds at which the conveyor chains move may deviate from one another if a plurality of conveyor chains are used.

In a preferred embodiment of the conveyor device in accordance with the invention, provision is made for the conveyor to be in the form of a loading-platform type of conveyor and for the mounting devices to be in the form of a respective loading platform.

It is expedient if the base part of the respective directly driven mounting device makes contact with the base part of the indirectly driven mounting device.

In order to obtain a conveyor path which is bridgeable by means of a drive device for the conveyor whilst still being as long as possible, provision is advantageously made for the movement of the respective directly driven mounting device to be transmitted to at least two indirectly driven mounting devices.

The directly driven mounting device and the plurality of indirectly driven mounting devices together form a series of mounting devices which moves as a unit in the direction of conveyance.

As yet, no specific indications have been given as to the type of drive device that is to be used. In principle, it is possible to use any type of drive that is suitable for setting the directly driven mounting device in motion in the direction of conveyance.

In the case of a preferred embodiment of the invention, it is proposed that the drive device comprise a friction wheel drive.

In order to ensure that the mounting devices in a series of mounting devices do not run-apart but always remain in contact with one another, it is to advantage if the conveyor comprises at least one braking mechanism by means of which in each case at least one mounting device moving in the direction of conveyance is adapted to be braked.

This braking mechanism could also comprise a friction wheel brake for example.

In order to enable the conveyor to be operated continuously, the mounting devices are preferably advanced through the conveyor in circulating manner.

In order to decrease the space occupied by the conveyor, provision may be made for the conveyor to comprise a forward-movement zone for the mounting devices and a return-movement zone therefor, said return-movement zone being arranged above or below the forward-movement zone. In this case, the conveyor comprises a lifting station for lifting the mounting devices and/or a lowering station for lowering the mounting devices in order to enable the mounting devices to be transported between the level of the forward-movement zone and the level of the return-movement zone.

As an alternative thereto, provision could also be made for the conveyor to comprise a return-movement zone for the mounting devices which is arranged in the same plane as the forward-movement zone and is located adjacent thereto. In this case the conveyor comprises at least one transverse transporting mechanism in order to enable the mounting devices to be advanced from the forward-movement zone to the return-movement zone and back again to the forward-movement zone.

In a preferred embodiment of the invention, provision is made for at least one roller to be arranged on the base part of a mounting device, said roller rolling on a running rail when the mounting device moves in the direction of conveyance.

In order to enable a work-piece held on a mounting device to be rotated into the processing zone and then rotated out of the processing zone again in a defined manner, the rotary part of a mounting device advantageously comprises at least one guide element and the conveyor comprises at least one guide track on which the guide element is guided in such a manner that the rotary part will rotate relative to the base part.

In order to enable the guide track of the conveyor to be constructed in as simple a manner as possible, it is of advantage if the rotary part comprises a plurality of guide elements which are guided successively on the guide track during the rotation of the rotary part.

Furthermore, provision may be made for the guide track to comprise a plurality of guide track sections which succeed one another in the direction of conveyance, a respective one of the guide elements being guided on each said section during the rotation of the rotary part.

In order to enable the guide elements of the rotary part to emerge from the guide track or to enter the guide track, it is expedient if the guide track sections which succeed one another in the direction of conveyance are spaced from one another in the direction of conveyance.

The guide track of the conveyor can be designed in a particularly simple manner if the guide elements of the rotary part are arranged in such a manner that the angular spacings between neighbouring guide elements taken with reference to the axis of rotation of the rotary part exhibit at least two different values.

In particular, provision may be made for the angular spacings between neighbouring guide elements taken with reference to the axis of rotation of the rotary part to be alternately approximately 60° and approximately 120°.

Further features and advantages of the invention form the subject matter of the following description and the sketched illustration of an embodiment.

In the drawings,

FIGS. 1a and 1b show a schematic side view of a conveyor device for advancing vehicle bodies through a treatment bath used for the surface treatment of the vehicle bodies;

FIGS. 2a and 2b show a schematic plan view of the conveyor device in FIGS. 1a and 1b;

FIG. 3 shows an enlarged schematic side view of the central forward-movement zone of the conveyor device together with the treatment bath in which a spider of a vehicle body mounting device is illustrated in a plurality of successive movement phases;

FIG. 4 shows a schematic plan view of the central forward-movement zone of the conveyor device together with the treatment bath;

FIG. 5 shows a schematic section through a vehicle body arranged on a vehicle body mounting device and the treatment bath;

FIG. 6 shows a schematic plan view of a vehicle body mounting device;

FIGS. 7 to 15 show schematic side views of the central forward-movement zone of the conveyor device, in which a plurality of successive movement phases of the vehicle body mounting devices and the vehicle bodies arranged thereon are illustrated.

Similar or functionally equivalent elements are designated by the same reference symbols in all of the Figures.

A conveyor device, which is illustrated in FIGS. 1a, 1b to 15 and bears the general reference 100 and is used for advancing vehicle bodies 104 arranged on skid-frames 102 through a treatment bath 108 (for example a dip-coating bath) that is arranged in a dip-tank 106 for the surface treatment of the vehicle bodies 104, comprises an input-end lowering station 110 for lowering vehicle body mounting devices in the form of loading platforms 112 from a return-movement zone 114 arranged at an upper level down to a forward-movement zone 116 of the conveyor device 100 that is arranged at a lower level.

Furthermore, the conveyor device 100 comprises an output-side lifting station 118 in which the loading platforms 112 are raised from the level of the forward-movement zone 116 to the level of the return-movement zone 114.

For the purposes of lowering or lifting the loading platforms 112, the lowering station 110 and the lifting station 118 may each be provided with a scissor-action elevating platform for example.

The vehicle bodies 104 arranged on the skid-frames 102 are deposited onto an empty loading platform 112 in the lowering station 110, fixed thereto and then advanced in the direction of conveyance 120 through the forward-movement zone 116, whereby the vehicle bodies 104 will be moved into the treatment bath 108 and then removed therefrom in a manner which will be described in greater detail hereinafter.

In the lifting station 118, the vehicle body 104 arranged on the skid-frame 102 is released from the loading platform 112 and advanced by means of a (not illustrated) further conveyor device from the lifting station 118 into a following treatment section, for example, into a dryer.

The empty loading platform 112 is raised to the level of the return-movement zone 114 in the lifting station 118 and fed back through the return-movement zone 114 in the return direction 122 to the lowering station 110 wherein the empty loading platform 112 is again lowered down to the level of the forward-movement zone 116 in order to accommodate once more a vehicle body 104 arranged on a skid-frame 102.

Accordingly, the loading platforms 112 are advanced in circulating manner through the lowering station 110, the forward-movement zone 116, the lifting station 118 and the return-movement zone 114.

The construction of a loading platform 112 will be described in more detail hereinafter with reference to FIG. 6.

Each loading platform 112 comprises a base part 124 consisting of an essentially rectangular basic framework 126 that is composed of longitudinal beams 130 which are aligned in parallel with a longitudinal direction 128 of the loading platform 112 and of transverse beams 132 which connect the longitudinal beams together at the ends thereof.

A respective roller carrier 134 extends perpendicularly downward from each end of each of the longitudinal beams 130 (see FIG. 5). A respective idler roller 136, which comprises a wheel flange 140 facing the longitudinal central plane 138 of the loading platform 112, is mounted in rotatable manner at the lower end of each roller carrier 134.

As can be seen from FIG. 3, a respective roller carrier 134 located in front in the direction of conveyance 120 and a respective roller carrier located to the rear in the direction of conveyance 120 are connected together at their lower ends by means of a lower longitudinal beam 142.

Additional bracings 144, which respectively connect a roller carrier 134 to a central portion of a longitudinal beam 130, serve to increase the stability of the base part 124.

Furthermore, the loading platform 112 comprises a rotary part 146 (FIG. 6) consisting of an essentially rectangular rotary framework 148 which (in a rest position of the rotary part 146) comprises longitudinal beams 150 that are aligned in parallel with the longitudinal direction 128 and outer transverse beams 152 that connect these longitudinal beams together at the ends thereof.

Between the outer transverse beams 152, there are provided, for example two, further inner transverse beams 154 which likewise interconnect the longitudinal beams 150 of the rotary framework 148 and support skid clamping devices 156 that are used for accommodating and locking a skid-frame 102.

Furthermore, there is provided a rotary shaft 158 which extends along the transverse central plane 160 of the loading platform through the longitudinal beams 150 of the rotary framework 148, is connected to the longitudinal beams in mutually non-rotational manner by means of screw-on flanges 162 and is mounted in freely rotatable manner in bearing blocks 164 that are fixed to the upper face of the longitudinal beams 130 of the base part 124.

Consequently, the rotary part 146 is rotatable through arbitrary angles relative to the base part 124 about the axis of rotation 166 of the rotary shaft 158.

Furthermore, as can be seen from FIGS. 3 to 6, the two ends of the rotary shaft 158 projecting beyond the bearing blocks 164 are provided with a respective spider 168 which serves as a guide element, and each one of these comprises a lower front leg 170a, an upper front leg 170b, an upper rear leg 170c and a lower rear leg 170d, whereby the lower front leg 170a includes an angle of approximately 60° with the upper front leg 170b, an angle of 180° with the upper rear leg 170c and an angle of approximately 240° (or 120°) with the lower rear leg 170d.

In the rest position of the rotary part 146, the lower front leg 107a is at an angle of approximately 30° with respect to the horizontal.

A respective camshaft roller 172a, 172b, 172c and 172d is mounted in rotatable manner at the free end of each of the legs 170a, 170b, 170c and 170d.

The spiders 168 together with the camshaft rollers 172a to 172d serve for controlling a rotational motion of the rotary part 146 as will be described in more detail hereinafter.

In the lowering station 110, the previously described loading platform 112 is seated by means of the idler rollers 136 upon two running rails 174 which extend in parallel with the direction of conveyance 120 and are mutually spaced in a direction transverse to the direction of conveyance 120 (see FIG. 5) in such a manner that the idler rollers 136 can roll on the upper surface of the running rails 174 whilst the wheel flanges 140 of the idler rollers 136 prevent a movement of the loading platform 112 perpendicularly relative to the direction of conveyance 120.

Rather than using wheel flanges 140 on the idler rollers 136, separate lateral guide rollers could also be provided on the loading platform 112 in order to prevent a movement thereof perpendicularly to the direction of conveyance 120.

As can best be seen from FIG. 5, the camshaft rollers 172a and 172d on the lower legs of the spiders 168 engage in two guide tracks 176 which extend in parallel with the direction of conveyance 120 and are mutually spaced in a direction transverse to the direction of conveyance 120.

In the present case, each guide track 176 is constructed in the form of a U-profiled element having a lower horizontal leg 178, an upper horizontal leg 180 and a vertical bar 182 which connects the two horizontal legs 178 and 180 together.

The lower camshaft rollers 172a and 172d roll on the upper surface of the lower horizontal leg 178 and thus prevent a rotation of the rotary part 146 relative to the base part 124 of the loading platform 112 in the case of a horizontally extending guide track 176.

As previously mentioned, in the lowering station 110, a vehicle body arranged on a skid-frame 102 is advanced into the lowering station 110 on each occasion by means of a (not illustrated) conveyor device, deposited onto an empty loading platform 112 and fixed in releasable manner to the rotary part 146 by means of the skid clamping device 156.

Each of the skid-frames 102 is constructed in known manner and each comprises, in particular, two skid runners 184 (FIG. 5) which are aligned in parallel with the longitudinal direction of the vehicle body and are mutually spaced in a direction transverse to said direction, vertical supports 186 which carry crossbeams 188, as well as tie rails 190 which connect the two skid runners 184 together (FIG. 4).

The vehicle body 104 is fixed to the crossbeams 188 of the skid-frame 102 in releasable manner by means of vehicle body clamping devices 192 which are themselves known and so will not be described here in greater detail (FIG. 5).

As can be seen from FIG. 5, the skid clamping devices 156 of the rotary part 146 of the loading platform 112 engage with the skid runners 184 of the skid-frame 102.

As can be seen from FIG. 2a, in the lowering station 110, a respective friction wheel drive 192 incorporating a respective friction drive wheel 194 is arranged at each side of the loading platform 112, whereby each friction drive wheel 194 is adapted to be driven in rotary manner about a vertical axis by means of a motor whilst the periphery thereof is in contact with a respective one of the lower longitudinal beams 142 of the base part 124 of the loading platform 112 so that the loading platform 112 will be set in motion in the direction of conveyance 120 when the friction drive wheels 194 are caused to rotate (in a clockwise sense as seen from above).

After a vehicle body 104 together with its skid-frame 102 has been fixed to the loading platform 112 located in the lowering station 110, the friction wheel drives 192 of the lowering station 110 are set in motion in order to advance the loading platform 112 into an intake section 196 of the forward-movement zone 116 of the conveyor device 100 which follows thereon.

The intake section 196 is also provided with a respective friction wheel drive 198, which comprises a respective friction drive wheel 200, on each side of the loading platforms 112 that are being advanced therethrough.

Whilst the friction wheel drives 192 in the lowering station 110 work on a clock-pulsed basis, the friction wheel drives 198 of the intake section 196 operate in a continuous manner in order to further advance a loading platform 112 that has entered the intake section 196 at the intake speed until it knocks against the rearmost loading platform of a series of loading platforms 202 that is being advanced at the process feed speed with the loading platforms in this series being moved together through a main section 204 of the forward-movement zone 116 which follows the intake section 196, whereupon it is driven by main friction wheel drives.

As can be seen from FIGS. 1a, 1b, 2a, 2b and 7 to 15, the loading platforms 112 in the series of loading platforms 202 make contact with one another in such a manner that the front ends of the longitudinal beams 130 and the front roller carriers 134 of a loading platform 112 located more to the rear in the direction of conveyance 120 are in contact with the rear ends of the longitudinal beams 130 and the rear roller carriers 134 of the loading platform 112 located immediately prior to the first loading platform 112 in the direction of conveyance 120. By virtue of this direct contact between the loading platforms 112 succeeding one another in the direction of conveyance 120, it is possible to transmit a forward movement i.e. a forwardly directed driving force from a loading platform 112 located further back in the direction of conveyance 120 to the loading platform 112 located more forwardly in the direction of conveyance 120.

Consequently, of the loading platforms 112 appertaining to the series of loading platforms 202 which is moving through the main section 204 of the forward-movement zone 116 of the conveyor device 100, only that loading platform 112a that is currently in the most rearward position will be directly driven by means of the main friction wheel drives 206 located at the beginning of the main section 204, whilst those loading platforms 112b in the series of loading platforms 202 located more forwardly thereof will only be driven indirectly by virtue of the contact thereof with the respective loading platform 112 located further behind it.

Since the main friction wheel drives 206 must drive the entire series of loading platforms 202 directly or indirectly, they are each provided with a plurality of friction drive wheels 208, for example, they are each provided with four friction drive wheels 208.

In this way, each of the loading platforms 112 is advanced as a component of the series of loading platforms 202 through the main section 204 and, in particular, through the dip tank 106 which is arranged between the running rails 174 and contains the treatment bath 108.

In order to move the vehicle bodies 104 located in the initial portion of the treatment bath 108 into the treatment bath 108 and to extract the vehicle bodies 104 present in the final portion of the treatment bath 108 from the treatment bath 108 again, the rotary part 146 of each loading platform 112 is rotated relative to the base part 124 of the loading platform 112, whereby the course of the rotary motion is controlled by means of the spiders 168.

For this purpose, each of the guide tracks 176 comprises four successive guide track sections 210a, 210b, 210c and 210d within the treatment bath 108.

As can be seen from FIG. 3 and from FIGS. 7 to 15, the first guide track section 210a is essentially in the form of a V comprising a first partial section which is directed downwardly at an angle of approximately 45°, and a second partial section which is directed upwardly at an angle of approximately 45°.

The guide track 176 is interrupted at the end of the second partial section of the first guide track section 210a. The second guide track section 210b is spaced from the first guide track section 210a in the direction of conveyance 120 and extends from the lower level of the guide track at an angle of approximately 45° up to the upper level of the guide track where the guide track 176 is again interrupted.

The third guide track section 210c that is spaced from the second guide track section 210b in the direction of conveyance 120 is essentially in the form of a V in like manner to the first guide track section 210a, whereby a first partial section of the third guide track section 210c extends from the upper level of the guide track at an angle of approximately 45° down to the lower level of the guide track and a second partial section of the third guide track section 210c extends back at an angle of approximately 45° from the lower level of the guide track to the upper level of the guide track where the guide track 176 is again interrupted.

The fourth guide track section 210d is spaced from the third guide track section 210c in the direction of conveyance 120 and extends at an angle of approximately 45° from the lower level of the guide track up to the upper level of the guide track from where the guide track 176 then runs in the horizontal direction once more.

When a vehicle body K1 enters the initial portion of the treatment bath 108 (see FIG. 7), the lower front camshaft roller 172a of the spider 168 of the appertaining loading platform 112 then runs through the first guide track section 210a from the upper level of the guide track down to the lower level of the guide track, whereby the spider 168, the rotary part 146 and the vehicle body K1 connected thereto in mutually non-rotational manner are rotated through an angle of approximately 60° about the axis of rotation 166 (in a clockwise sense as viewed in FIG. 7). The front portion of the vehicle body K1 thus dips into the treatment bath 108 wherein the liquid level is denoted by 212 (see FIG. 8).

In order to make this rotary motion possible, the upper leg 180 of the guide track 176 is provided with an interruption 214, through which the lower rear camshaft roller 172d can emerge from the guide track 176, at a point located prior to the first guide track section 210a.

Whilst the base part 124 of the loading platform 112 is moved forward continuously in the direction of conveyance 120, the lower front camshaft roller 172a runs back again to the upper level of the guide track in the second partial section of the first guide track section 210a (see FIG. 9), whereby the rotary part 146 and the vehicle body K1 continue to rotate in the clockwise direction through an angle of approximately 60° until the lower front camshaft roller 172a emerges from the first guide track section 210a and the upper front camshaft roller 172b enters the second guide track section 210b (see FIG. 10). At this point in time, the entire front part of the vehicle body K1 and almost the entire roof of the vehicle body K1 have already dipped into the treatment bath 108.

In the case of a continuous forward movement of the base part 124 of the loading platform 112 in the direction of conveyance 120, the upper front camshaft roller 172b runs upwardly to the upper level of the guide track in the second guide track section 210b, whereby the spider 168 together with the rotary part 146 and the vehicle body K1 continue to rotate in the same direction of rotation through approximately a further 60° until the upper front camshaft roller 172b emerges from the second guide track section 210b whilst the upper rear camshaft roller 172c simultaneously enters the third guide track section 210c (see FIG. 11).

In this state, the rotary part 146 together with the body K1 have been rotated through 180° from the rest position so that the vehicle body K1 is now located completely in the treatment bath 108. In this inverted position in which the roof of the vehicle body is below the floor-pan of the vehicle body, the vehicle body K1 could now be advanced through the treatment bath 108 in the direction of conveyance 120 if a horizontal guide track section were to be provided at the upper level of the guide track between the second guide track section 210b and the third guide track section 210c.

However, in the embodiment illustrated here, provision is made for the vehicle body K1 to be immediately rotated out of its inverted position whilst it is being advanced further through the treatment bath 108.

Namely, the upper rear camshaft roller 172c runs downwardly to the lower level of the guide track in the first partial section of the third guide track section 210c (see FIG. 12), whereby the spider 168 together with the rotary part 146 and the vehicle body K1 continue to be rotated through an angle of approximately 60° in the clockwise direction (as viewed in FIG. 12), i.e. the previous direction of rotation is maintained so that the front part of the vehicle body K1 will reappear from the treatment bath 108.

Whilst the base part 124 of the loading platform 112 moves forward continuously in the direction of conveyance 120, the upper rear camshaft roller 172c again runs upwardly in the second partial section of the third guide track section 210c (see FIG. 13) until the upper rear camshaft roller 172c emerges from the third guide track section 210c and, at the same time, the lower rear camshaft roller 172d enters the fourth guide track section 210d (FIG. 14). Hereby, the vehicle body K1 will continue to be rotated until such time as just the lower part of the rear portion of the vehicle body K1 is located in the treatment bath 108.

At the same time, the lower front camshaft roller 172a of the spider 168 of the following loading platform 112, on which the vehicle body K2 is located, runs downwardly from the upper level of the guide track in the first guide track section 210a whereby the vehicle body K2 is rotated into the treatment bath 108.

In the course of the progressive, continuous forward movement of the base part 124 in the direction of conveyance 120, the lower rear camshaft roller 172d associated with the vehicle body K1 runs upwardly to the upper level of the guide track in the fourth guide track section 210d, whereby the spider 168 together with the rotary part 146 and the vehicle body K1 will be rotated back again into the starting position in which the roof of the vehicle body K1 is disposed above the floor-pan of the vehicle body (see FIG. 15).

Hereby, the lower front camshaft roller 172a enters the guide track 176 once again through an interruption 214 (see FIG. 14) in the upper leg 180 of the guide track 176 which is located behind the fourth guide track section 210d in the direction of conveyance 120.

During the further forward movement of the base part 124 in the direction of conveyance 120, both the lower front camshaft roller 172a and the lower rear camshaft roller 172d now run within the horizontal guide track 176 so that, in the course of the further translatory movement of the loading platform 112, the rotary part 146 will no longer rotate relative to the base part 124.

The loading platform 112 together with the body K1 arranged thereon is thus restored to the rest position when reaching a braking section 216 of the forward-movement zone 116 (see FIG. 2b) which follows the main section 204 and wherein a respective friction wheel brake 218 incorporating a respective friction brake wheel 220 is arranged on each side of the skid-platforms 112.

In addition, the friction brake wheels 220 are in contact with the longitudinal beams 130 of the loading platforms 112 but rotate in a direction which is opposite to the direction of rotation of the friction drive wheels 194, 200 and 208 (in a counter-clockwise sense as seen from above) and is thus opposed to the direction of motion of the loading platforms 112, so that the pertinent loading platform 112 in the series of loading platforms 202 located in the braking section 216 is braked by means of the friction wheel brake 218.

It is thereby ensured that the loading platforms 112 in the series of loading platforms 202 will not run apart but will always remain in contact with one another.

As can be seen from FIG. 2b, a discharge section 222 of the forward-movement zone 116 of the conveyor device 100 follows the braking section 216 and a respective friction wheel drive 224 incorporating a respective friction drive wheel 226 is arranged therein on each side of the path of the loading platforms 112.

The friction wheel drives 224 of the discharge section 222 advance a respective loading platform 112 into the lifting station 118 at the discharge speed on a clock-pulsed basis and, in said station, the vehicle body 104 arranged thereon together with the skid-frame 102 is released from the loading platform 112 by opening the skid clamping device 156 and then lifted up, whereafter it is seated on a further (not illustrated) conveyor device which conveys the vehicle body 104 together with the skid-frame 102 out of the lifting station 118.

The intake and discharge speeds of the skid-frames 112 are higher than the process feed speed with which the series of loading platforms 202 is advanced through the main section 204 of the forward-movement zone 116.

Finally, the empty loading platform 112 is raised to the level of the return-movement zone 114 of the conveyor device 100 and returned by means of (not illustrated) friction wheel drives in the return direction 122 to the lowering station 110 where the empty loading platform 112 is again lowered to the level of the forward-movement zone 116 in order to accommodate a new vehicle body 104 together with its skid-frame 102.

What is claimed is:

1. A conveyor device for advancing work-pieces through a processing zone for the surface treatment of the work-pieces, comprising:
    a conveyor which moves the work-pieces mounted on a respective mounting device into the processing zone, advances the workpieces through the processing zone and then removes the workpieces from the processing zone,
    wherein:
    the mounting devices each comprise a respective base part which is moved in a translatory manner in a direction of conveyance and a rotary part upon which the work-piece is arranged and which is mounted in rotatable manner on the base part,
    the conveyor comprises at least one drive device by means of which at least one respective directly driven mounting device is adapted to be driven directly for movement in the direction of conveyance, and
    by virtue of contact between the directly driven mounting device and at least one indirectly driven mounting device, the movement of the directly driven mounting device is transmitted to the indirectly driven mounting device in the direction of conveyance.

2. A conveyor device in accordance with claim 1, wherein the base part of the respective directly driven mounting device is in contact with the base part of the indirectly driven mounting device.

3. A conveyor device in accordance with claim 1, wherein the movement of the respective directly driven mounting device is transmitted to at least two indirectly driven mounting devices.

4. A conveyor device in accordance with claim 1, wherein the drive device comprises a friction wheel drive.

5. A conveyor device in accordance with claim 1, wherein the conveyor comprises at least one braking mechanism, by means of which at least one respective mounting device moving in the direction of conveyance is adapted to be braked.

6. A conveyor device in accordance with claim 5, wherein the braking mechanism comprises a friction wheel brake.

7. A conveyor device in accordance with claim 1, wherein the mounting devices are advanced through the conveyor in circulating manner.

8. A conveyor device in accordance with claim 1, wherein the conveyor comprises at least one of a lifting station for lifting the mounting devices and a lowering station for lowering the mounting devices.

9. A conveyor device in accordance with claim 1, wherein at least one roller is arranged on the base part of a mounting device, said roller rolling on a running rail during the movement of the mounting device in the direction of conveyance.

10. A conveyor device in accordance with claim 1, wherein the rotary part of a mounting device comprises at least one guide element, and wherein the conveyor comprises at least one guide track on which the guide element is guided in such a manner that the rotary part is rotated relative to the base part.

11. A conveyor device in accordance with claim 10, wherein the rotary part comprises a plurality of guide elements which are guided successively on the guide track during the rotation of the rotary part.

12. A conveyor device in accordance with claim 11, wherein the guide track comprises a plurality of guide track sections that succeed one another in the direction of conveyance, a respective one of the guide elements being guided on said sections during the rotation of the rotary part.

13. A conveyor device in accordance with claim 12, wherein the guide track sections that succeed one another in the direction of conveyance are mutually spaced in the direction of conveyance.

14. A conveyor device in accordance with claim 11, wherein the guide elements are arranged in such a manner that angular spacings between neighbouring guide elements taken with reference to an axis of rotation of the rotary part comprise at least two different values.

15. A conveyor device in accordance with claim 1 which is adapted for advancing vehicle bodies through a processing zone for the surface treatment of the vehicle bodies.

* * * * *